E. H. WRIGHT & J. F. OAKLEAF.
PROCESS FOR TREATING WASTE LIQUOR.
APPLICATION FILED JUNE 11, 1914.
1,236,031.
Patented Aug. 7, 1917.
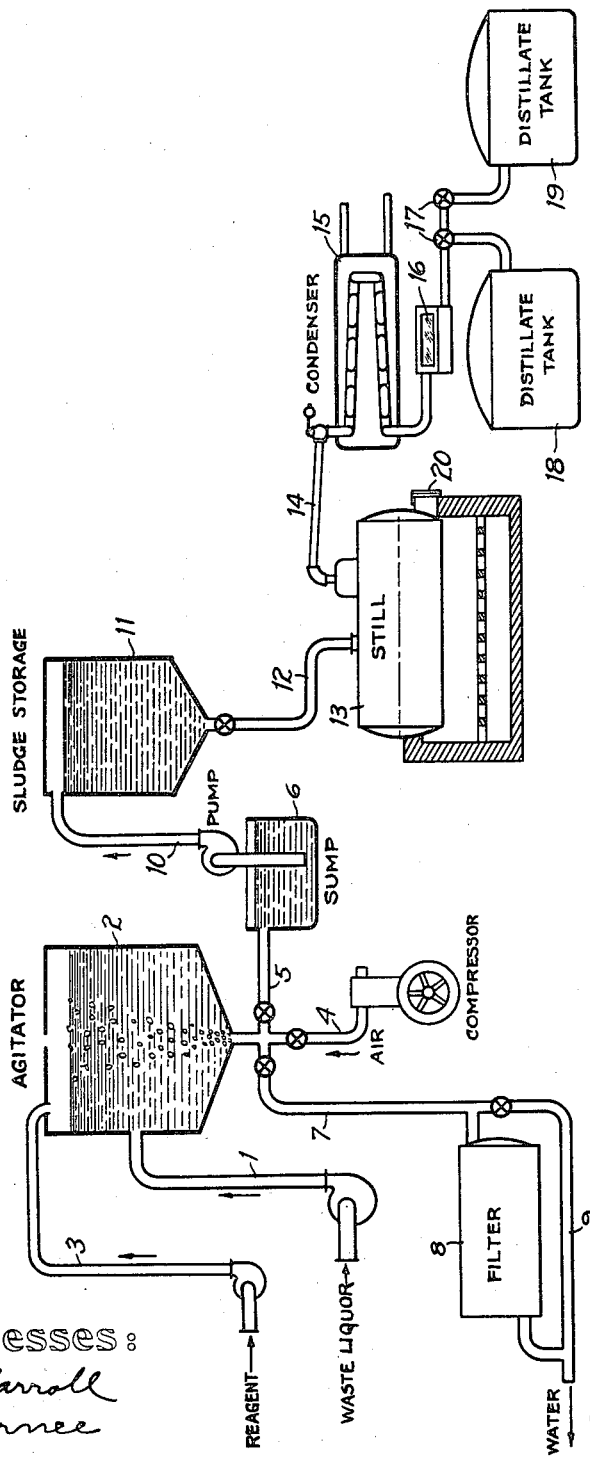

UNITED STATES PATENT OFFICE.

EDWARD H. WRIGHT AND JAMES F. OAKLEAF, OF OLEAN, NEW YORK, ASSIGNORS TO VACUUM OIL COMPANY, OF ROCHESTER, NEW YORK, A CORPORATION OF NEW YORK.

PROCESS FOR TREATING WASTE LIQUOR.

1,236,031.  Specification of Letters Patent.  Patented Aug. 7, 1917.

Application filed June 11, 1914. Serial No. 344,523.

*To all whom it may concern:*

Be it known that we, EDWARD H. WRIGHT and JAMES F. OAKLEAF, citizens of the United States, and residents of Olean, in the county of Cattaraugus and State of New York, have invented certain new and useful Improvements in Processes for Treating Waste Liquor, of which the following is a specification.

This invention relates to the treatment of waste-liquors containing mineral oil, particularly when the oil, or a part of it, is mechanically suspended, in a colloidal or finely-divided form, in a large volume of water which also contains soluble organic or mineral salts.

In the manufacture of lubricating-oils from petroleum it is common to employ a decolorizing process which involves treatment of the oil with sulfuric acid, the oil being afterward washed with water to remove the acid and the salts produced thereby, and the use of caustic soda to neutralize any residual acid, with further washing of the oil to remove the alkaline compounds which are formed by the soda. All of the water and the waste-products of this process are commonly mingled and discharged as worthless, owing to the comparatively small amount of hydrocarbons contained thereby.

The discharge of waste liquors of the character above described into water-courses is objectionable, as the dissolved substances are destructive to fish and render the water impotable. Furthermore, we have discovered that the amount of solids and hydrocarbons recoverable from such liquors is sufficient to more than pay for the expense of their separation. Accordingly, the object of the present invention is to produce a process whereby waste liquor of the kind in question may be treated economically in such a manner as to separate substantially all of the suspended and dissolved substances from the water, and to convert the material so separated into fluids and solids of commercial value.

The process by which we attain the foregoing object is based upon the fact that by treatment of the oil-containing waste liquor with a reagent, such as lime, capable of forming, with the soluble salts, an insoluble precipitate, not only will the dissolved substances be separated from the water, but oil which is merely suspended therein, in colloidal or emulsified form, will also be separated, owing to the fact that it is occluded by the precipitate, so that practically all of the foreign substances may be collected in the form of a sludge of either greater or lesser specific gravity than that of the water, the sludge being then separable from the bulk of the water by the action of gravity or of centrifugal force.

By the formation and separation of the sludge the water is substantially purified, while at the same time the oils and solids are sufficiently concentrated to permit the economical recovery of the valuable constituents by distillation, which constitutes the final step of our novel process. In this distillation the water and the lighter uncombined oils first pass off and may be condensed and separated in the usual manner. The temperature of the still is then raised sufficiently to evaporate the heavier oils and to decompose the salts of complex sulfonic and sulfuric acids, thus producing further valuable distillates. At the termination of the operation there remains in the still a coke-like residue which contains the inorganic acid and basic constituents of the liquor, but which consists largely or chiefly of uncombined carbon, so that the residue has a substantial fuel-value.

The process above described may be carried out in any well-known apparatus for conducting the several essential steps. In the accompanying drawing, however, we have shown, diagrammatically, an arrangement of apparatus suitable for the purpose.

In the illustrated apparatus the oil-containing liquor is pumped, through a pipe 1, into a large receptacle 2, which may be described as an agitator, in which the precipitating operation is carried out. In this agitator the reagent such, for example, as milk of lime, is added to the liquor through a pipe 3.

The reaction in the agitator is facilitated by agitating its contents by the injection of compressed air at the bottom of the agitator, and for this purpose we have shown a compressor which supplies air to the agitator through a valve-controlled pipe 4.

Assuming that the waste liquor to be treated is the ordinary waste from the acid and alkali process of decolorizing oil, its constituents, besides a large volume of water, usually comprise finely-divided uncombined oil in colloidal or emulsified form, sodium salts of sulfonic acid, sodium salts of compound sulfuric acids, and small quantities of free acid or tarry substances. When this mixture is agitated with the milk of lime insoluble calcium salts are formed, by the reaction of the lime with all of the dissolved substances in the sewage, so that practically all of the solids are separated in the form of an insoluble precipitate. At the same time practically all of the uncombined oil suspended in the water is occluded by this precipitate. When the agitation has been continued sufficiently to complete the reaction the introduction of air is stopped, and the contents of the agitator are then allowed to stand long enough for the precipitate and the occluded oil to separate, by the action of gravity, in the form of a sludge, which may either settle or float, according to the character of its contents.

The sludge at the bottom of the agitator is next drawn off through a valve-controlled pipe 5, which discharges into a receptacle or sump 6, and next the supernatant clear water is drawn off through a valve-controlled pipe 7, after which such of the sludge as floated at the top is drawn into the sump. The clear water is substantially purified, except that in some cases a small quantity of the most flocculent parts of the precipitate may remain in it. For the removal of such matter it is passed through a sand-filter 8, but in most cases it may be passed directly through a by-pass pipe 9, and discharged at any convenient point, such as a running stream, in a purified and harmless condition.

The sludge which is collected in the sump 6 is next pumped, through a pipe 10, into a storage-tank 11 from which it may be drawn in successive charges, through a pipe 12, into the still 13. This still is first heated sufficiently to vaporize the water remaining in the sludge, together with the lighter uncombined hydrocarbons or oils, and the distillate is passed through a condenser 15, the effluent from which passes through a "look-box" 16 to valves 17, by which it may be directed selectively to tanks 18 and 19, in which the distillate is collected and the oil is permitted to separate from the water.

After the evaporation of the water and the lighter oils, the temperature of the still is raised sufficiently to vaporize the heavier oils, a temperature of approximately 700° F. being necessary for the heaviest petroleum constituents, and at the same time the oil-containing calcium compounds are decomposed, the hydrocarbons being thus recovered therefrom in the form of distillates which are condensed and collected in the distillate tanks.

The final residue in the still, containing the inorganic bases and acids, and also a large quantity of uncombined carbon, may be removed from the still through a manhole 20 and used economically as fuel, for the purpose of heating the still, or for any other purpose.

Although we have shown only a single agitator and still, it is preferable, for the sake of continuous operation, to employ batteries of these devices which can be used alternately.

While we have described our novel process particularly as applied to waste liquor resulting from the acid and alkali process for decolorizing oil, it will be apparent that it is applicable to any waste liquor containing oil, together with a sufficient quantity of soluble salts to permit the formation of a precipitate which will collect the oil mechanically suspended in the liquor, and it will also be apparent that where the amount of such soluble substances is not sufficient for this purpose it may be augmented by the addition of suitable salts, in addition to the lime or other precipitating reagent.

We claim:—

1. The process of oil-recovery which comprises (1) the treatment of waste liquor from the acid and alkali treatment of mineral oil consisting chiefly of water, containing salts including complex sodium sulfonates and sodium sulfates in solution and a relatively small quantity of oil suspended in finely divided form, with a reagent capable of producing, with the said soluble salts, an insoluble precipitate in which the suspended oil is occluded; and (2) the mechanical separation of the bulk of the clarified water from the resulting precipitate.

2. The process of oil-recovery which comprises (1) the treatment of waste liquor from the acid and alkali treatment of mineral oil consisting chiefly of water, containing salts including complex sodium sulfonates and sodium sulfates in solution and a relatively small quantity of oil suspended in finely divided form, with a reagent capable of producing, with the said soluble salts, an insoluble precipitate in which the suspended oil is occluded; (2) the mechanical separation of the bulk of the clarified water from the resulting precipitate; and (3) the drying and distillation of the sludge to recover the oil therefrom.

3. The process of oil-recovery which comprises (1) the treatment of waste liquor from the acid and alkali treatment of mineral oil consisting chiefly of water, containing salts including complex sodium sulfonates and sodium sulfates in solution and a relatively small quantity of oil suspended in finely divided form, with a reagent capable of producing, with the said soluble salts, an insoluble precipitate in which the suspended oil is occluded; (2) the mechanical separation of the bulk of the clarified water from the resulting precipitate; (3) the evaporation of the remaining water from the precipitate; and (4) the destructive distillation of the dried sludge to recover hydrocarbons therefrom, thereby reducing the residuum to a coke-like body comprising free carbon and mineral salts.

EDWARD H. WRIGHT.
JAMES F. OAKLEAF.

Witnesses:
GEORGE A. LARKIN,
JAMES E. FANE.